(12) United States Patent
Kusakata et al.

(10) Patent No.: US 7,368,007 B2
(45) Date of Patent: May 6, 2008

(54) INK-JET RECORDING INK, IMAGE FORMING METHOD, INK-JET RECORDING APPARATUS AND IMAGED ARTICLE

(75) Inventors: Shigeru Kusakata, Shizuoka (JP); Tsutomu Matsuda, Tokyo (JP); Masashi Itoh, Shizuoka (JP); Mamoru Soga, Osaka (JP); Hidekazu Arase, Hyougo (JP); Masaichiro Tatekawa, Osaka (JP)

(73) Assignees: Ricoh Company, Ltd., Tokyo (JP); Matsushita Electric Industrial Co., Ltd., Kadoma-shi (JP)

( * ) Notice: Subject to any disclaimer, the term of this patent is extended or adjusted under 35 U.S.C. 154(b) by 261 days.

(21) Appl. No.: 10/855,377

(22) Filed: May 28, 2004

(65) Prior Publication Data
US 2005/0005817 A1  Jan. 13, 2005

(30) Foreign Application Priority Data

| May 29, 2003 | (JP) | ............................. 2003-153122 |
| May 29, 2003 | (JP) | ............................. 2003-153175 |
| May 29, 2003 | (JP) | ............................. 2003-153199 |
| Jul. 1, 2003 | (JP) | ............................. 2003-189769 |

(51) Int. Cl.
*C09D 11/02* (2006.01)
(52) U.S. Cl. ................. 106/31.27; 106/31.13; 106/31.6
(58) Field of Classification Search ............ 106/31.27, 106/31.13, 31.6
See application file for complete search history.

(56) References Cited

U.S. PATENT DOCUMENTS

| 5,925,176 A | * | 7/1999 | Rehman | ................. 106/31.43 |
| 5,935,311 A | * | 8/1999 | Matsumura et al. | ..... 106/31.43 |
| 6,419,732 B1 | * | 7/2002 | Matsumura et al. | ..... 106/31.75 |
| 6,929,686 B2 | * | 8/2005 | Soga et al. | ............... 106/31.27 |
| 2003/0078320 A1 | * | 4/2003 | Yatake | ...................... 523/160 |
| 2003/0221586 A1 | * | 12/2003 | Arase et al. | ............. 106/31.27 |
| 2004/0031418 A1 | | 2/2004 | Soga et al. | |
| 2004/0041890 A1 | | 3/2004 | Soga et al. | |
| 2004/0082685 A1 | | 4/2004 | Soga et al. | |

FOREIGN PATENT DOCUMENTS

| JP | 2-255876 | 10/1990 |
| JP | 2-296878 | 12/1990 |
| JP | 3-91577 | 4/1991 |
| JP | 10/212439 | 8/1998 |
| JP | 11-293167 | 10/1999 |
| JP | 11-315231 | 11/1999 |
| JP | 2000-006515 | 1/2000 |
| JP | 2002-264476 | 9/2002 |
| JP | 2002-265829 | 9/2002 |
| JP | 2002-321437 | 11/2002 |
| JP | 2003-119413 | 4/2003 |
| WO | 02/072720 A1 | 9/2002 |

* cited by examiner

*Primary Examiner*—Elizabeth Wood
*Assistant Examiner*—Veronica Faison-Gee
(74) *Attorney, Agent, or Firm*—Oblon, Spivak, McClelland, Maier & Neustadt, P.C.

(57) ABSTRACT

An ink-jet recording ink contains at least a colorant, a moisturizer, water and a water-soluble substance capable of undergoing polycondensation along with vaporization of the water, in which the colorant is a chelate azo dye.

7 Claims, 6 Drawing Sheets

EXAMPLE B-2

EXAMPLE B-4

COMPARATIVE EXAMPLE B-1

COMPARATIVE EXAMPLE B-2

INK-JET RECORDING INK, IMAGE FORMING METHOD, INK-JET RECORDING APPARATUS AND IMAGED ARTICLE

BACKGROUND OF THE INVENTION

1. Field of the Invention

The present invention relates to ink-jet recording inks suitable for ink-jet recording, methods for forming water-resistant images suitable for ink-jet recording, ink-jet recording inks for use in the methods, ink-jet recording apparatus, and imaged articles imaged by the apparatus.

2. Description of the Related Art

Certain inks for use ink-jet recording comprise a dye as a colorant, a moisturizer and water. Images formed from these dye inks, however, have insufficient water resistance upon imaging on recording media such as recording paper. Particularly, when images are formed on plain paper using these inks, they have significantly low water resistance. Such plain paper is commercially available, is intended mainly to be used in electrophotographic copiers and is not optimized in its structure, composition and properties for use in ink-jet recording.

To increase water resistance in printing on plain paper, Japanese Patent Application Laid-Open (JP-A) No. 02-296878 and No. 02-255876 each disclose a water-based ink composition comprising a polyamine. However, in the ink, a salt of a hydrophilic moiety of the dye is formed, and the dye has decreased solubility, thus inviting nozzle clogging, decreased reliability, bronzing (association of the dye) on a printed matter, uneven printing and/or insufficient density.

JP-A No. 03-91577 discloses an ink composition. The ink composition includes a dye containing a carboxyl group with an ammonium salt group or volatile substituted ammonium salt group, in which ammonia or amine vaporizes and the carboxyl group is converted into a free acid on a recording medium to thereby produce an image with good water resistance. The dye shows good solubility in early stages but shows decreasing solubility with gradual vaporization of the ammonia or amine from the ink, thus often inviting nozzle clogging or decreased stability of ink.

As a possible solution to this problem, JP-A No. 10-212439, No. 11-293167, No. 11-315231 and No. 2002-265829 each disclose a technique of improving the water resistance of an image on a recording medium, by incorporating an organosilicon compound into an ink. The organosilicon compound is prepared by hydrolyzing a hydrolyzable silane compound having a nitrogen-containing organic group or its partial hydrolysate with a hydrolyzable silane compound or its partial hydrolysate.

According to this technique, the organosilicon compound undergoes polycondensation when an ink droplet is applied to a recording medium and water in the ink droplet vaporizes or penetrates into the recording medium, and the polycondensed organosilicon compound surrounds the dye. Thus, even when the resulting image on the recording medium gets wet with water, the dye does not bleed out into water, and the image has improved water resistance.

However, black inks among such conventional inks comprising the organosilicon compound fade after long-term storage. The fading is remarkable particularly in black inks containing an azo black dye. While its detailed mechanism has not been clarified, the fading occurs probably because the organosilicon compound attacks the azo bond of the azo black dye after long-term storage to thereby reduce the azo dye.

C. I. Acid Red 289 has high saturation, is useful as a magenta dye but does not show sufficiently high water resistance even with the use of the organosilicon compound. Hereinabove and hereinafter, "C. I." stands for color index. When an image formed from the ink gets wet, a magenta color bleeds out around the image.

The conventional inks comprising the organosilicon compound are also susceptible to their pH changes. Even when these inks are adjusted to basic in their preparation, their pH changes due to elution from ink tanks, degradation of the ink materials, or influence from the surroundings. The pH change induces precipitation, which in turn invites clogging of nozzle heads in an ink-jet printer. This is because such a dye used in an ink-jet ink is generally anionic and aggregates due to the pH change as a result of the incorporation of the organosilicon compound. This is also true for a pigment ink, because a pigment therein is dispersed stably generally by action of an anionic group adsorbed by or chemically bonded with the pigment.

SUMMARY OF THE INVENTION

Accordingly, an object of the present invention is to provide a black or magenta ink that does not substantially fade even after a long-term storage, can produce an image with high water resistance on plain paper and can be stably controlled in pH in a long period of time.

Another object of the present invention is to provide a method for forming an image with higher water resistance, in which an ink is discharged onto a print medium according to an ink-jet recording system, the ink contains an organosilicon compound or another water-soluble substance capable of undergoing polycondensation along with vaporization of water and the water-soluble substance herein can more effectively work to improve the water resistance.

Specifically, the present invention provides, in a first aspect, an ink-jet recording ink containing at least a colorant, a moisturizer, water, and a water-soluble substance capable of undergoing polycondensation along with vaporization of water, wherein the colorant is at least one chelate azo dye.

The chelate azo dye may be at least one of C. I. Acid Black 194 and C. I. Reactive Black 31.

In a second aspect, the present invention provide an ink-jet recording ink containing at least a colorant, a moisturizer, and water, wherein the colorant is C. I. Acid Red 289, wherein the C. I. Acid Red 289 shows an area A of its major peak and a total area B of peaks at retention times 1.2 or more, provided that the retention time of the major peak is 1, in a liquid chromatogram, and wherein the ratio (A/B) of A to B is 4 or more.

The ink-jet recording ink just mentioned above may further contain a water-soluble substance capable of undergoing polycondensation along with vaporization of water.

The present invention further provides, in a third aspect, an ink-jet recording ink containing at least a colorant, a moisturizer, water, a water-soluble substance capable of undergoing polycondensation along with vaporization of water, and a pH buffer.

The ink-jet recording ink just mentioned above preferably has a pH of 8.0 to 11.0.

As the pH buffer, use can be made of at least one selected from N,N-bis(2-hydroxyethyl)glycine, N-cyclohexyl-3-aminopropanesulfonic acid, N-cyclohexyl-2-hydroxy-3-aminopropanesulfonic acid, N-cyclohexyl-2-aminoethanesulfonic acid, N-tris(hydroxymethyl)methyl-3-aminopropanesulfonic acid and N-[tris(hydroxymethyl)methyl]glycine.

The aforementioned inks may contain at least one organosilicon compound as the water-soluble substance.

The inks may further contain a polycondensation promoter capable of accelerating the polycondensation of the water-soluble substance.

Examples of the polycondensation promoter are inorganic ammonium salts and organic ammonium salts.

The ammonium salts may be salts of weak acids or salts of strong acids.

In a fourth aspect, the present invention provides an image forming method containing the step of discharging an ink-jet recording ink through a nozzle to a print medium having a surface treated with a cationic surface sizing agent, wherein the ink-jet recording ink contains an anionic-group-containing colorant, a moisturizer, water, and a water-soluble substance capable of undergoing polycondensation along with vaporization of water.

The print medium may be a plain-paper-like print medium containing plain paper having a surface treated with a cationic surface sizing agent.

The water-soluble substance is preferably at least one organosilicon compound.

The cationic surface sizing agent preferably contains at least one synthetic resin.

The cationic surface sizing agent may mainly contain at least one selected from alkylketene dimers, styrenic resins, acrylic resins and styrene-acrylic copolymers.

In a fifth aspect, the present invention provides an ink-jet recording ink for use in the image forming method containing an anionic-group-containing colorant, a moisturizer, water, and a water-soluble substance capable of undergoing polycondensation along with vaporization of water.

The present invention further provides, in a sixth aspect, an ink cartridge for use in the image forming method, housing an ink-jet recording ink, wherein the ink-jet recording ink contains an anionic-group-containing colorant, a moisturizer, water, and a water-soluble substance capable of undergoing polycondensation along with vaporization of water.

The present invention provides, in a seventh aspect, an ink-jet recording apparatus containing a head with at least one nozzle for discharging an ink-jet recording ink, wherein the ink-jet recording ink contains an anionic-group-containing colorant, a moisturizer, water and a water-soluble substance capable of undergoing polycondensation along with vaporization of water, and wherein the apparatus is so configured as to discharge the ink-jet recording ink from the nozzle onto a print medium having a surface treated with a cationic surface sizing agent to thereby form an image on the print medium.

In addition and advantageously, the present invention provides, in an eighth aspect, an imaged article containing a print medium having a surface treated with a cationic surface sizing agent, and an image formed on the print medium by discharging an ink-jet recording ink containing an anionic-group-containing colorant, a moisturizer, water and a water-soluble substance capable of undergoing polycondensation along with vaporization of water.

Further objects, features and advantages of the present invention will become apparent from the following description of the preferred embodiments with reference to the attached drawings.

DESCRIPTION OF THE PREFERRED EMBODIMENTS

Figure 1:
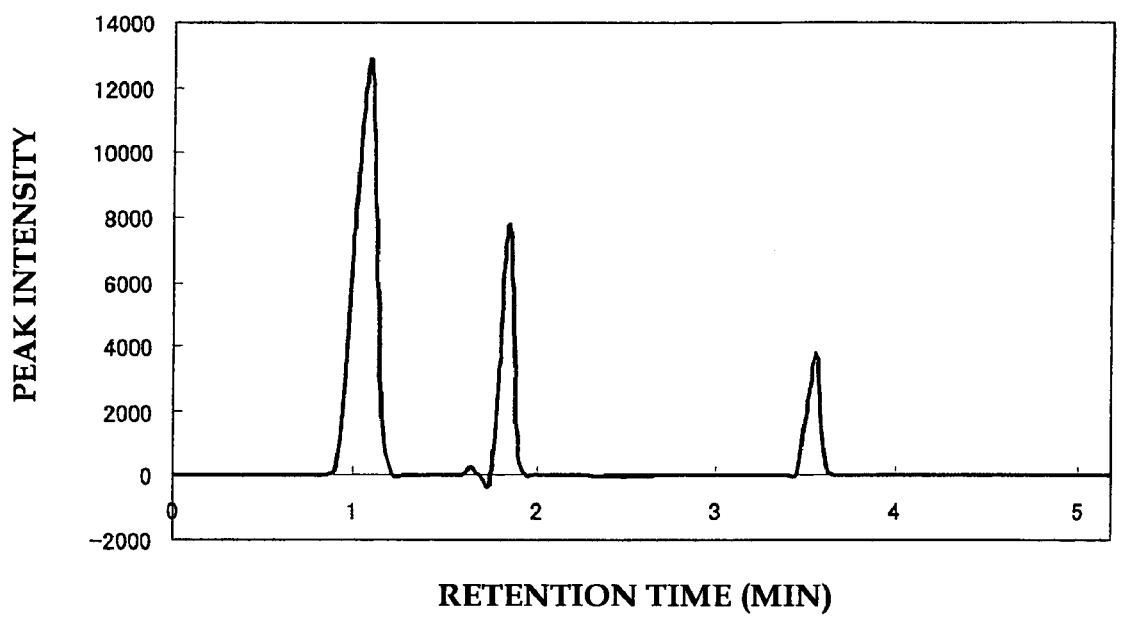
FIG. 1 is a liquid chromatogram of a commercially available C. I. Acid Red 289.

The ink-jet recording ink according to the first aspect of the present invention comprises at least a colorant, a moisturizer, water, and a water-soluble substance capable of undergoing polycondensation along with vaporization of the water, in which the colorant is a chelate azo dye.

The present inventors have found that an ink using a chelate azo dye as the colorant can be substantially free from fading even after long-term storage and have high water resistance. This is probably because chelating of the azo bond with a polyvalent metal prevents the black dye from attack of the organosilicon compound and thereby prevents fading.

Examples of the chelate azo dye are C. I. Direct Black 71; C. I. Acid Black 58, 60, 62, 64, 107, 108, 112, 115, 118, 119, 121, 122, 131, 132, 139, 140, 155, 156 and 194; and C. I. Reactive Black 1, 8, 9 and 31. Among them, C. I. Acid Black 194 and/or C. I. Reactive Black 31 is preferably used as the black dye in the ink-jet recording ink.

The content of the colorant in the ink is preferably from 0.5 to 15 percent by weight and more preferably from 1 to 10 percent by weight. If the content is 0.5 percent or below by weight, the resulting image may have an insufficient density. If it exceeds 15 percent by weight, nozzle clogging and the like may occur because of a saturated solubility (close to upper limit) of the dye.

The ink-jet recording ink according to the second aspect of the present invention comprises at least a colorant, a moisturizer and water, in which the colorant is C. I. Acid Red 289 which shows an area A of its major peak and a total area B of peaks at retention times 1.2 or more in a liquid chromatogram, provided that the retention time of the major peak is 1, and the ratio (A/B) of A to B is 4 or more.

The term "major peak" in liquid chromatographic analysis as used herein means a peak with a maximum intensity at actual measured retention times of 0.8 to 1.5 minutes determined under the following conditions.

Analysis Conditions:

Apparatus: Liquid chromatograph (available from JEOL Ltd.);

Pump: PU-980;

Column oven: TU-300;

Detector: UV detector SPD-10A (available from Shimadzu Corporation);

Column: ODS Column (available from GL Science) 5 mm in diameter and 150 mm in length;
Mobile phase: acetonitrile: water=8:2;
Pump flow rate: 1.0 ml/min.;
Column oven temperature: 40° C.;
Sample amount: 0.01 ml;
Detection wavelength: 254 nm;
Sample preparation: 1% Solution of a sample in a 7:3 mixture of acetonitrile and water.

The term "retention time" as used herein means a period of time between the injection of a sample into a liquid chromatograph and the detection of the sample passed through a column by a detector. When measured under the same conditions (e.g., column, mobile phase flow rate, and the like), a substance may have a specific retention time due to its adsorption and/or desorption force with respect to the column, since the adsorption or desorption force depends on its specific molecular structure.

After investigations on low water resistance of C. I. Acid Red 289, the present inventors have found that a commercially available C. I. Acid Red 289 is a mixture of multiple components whose structures are not clarified, and that the water resistance can be improved by purifying the commercially available dye. The commercially available C. I. Acid Red 289 mainly comprises a monosulfonic acid derivative represented by the following Structural Formula 1 and probably further comprises, as impurities, its disulfonic acid derivative, mono- or di-sulfonic acid derivatives having substituents at different positions.

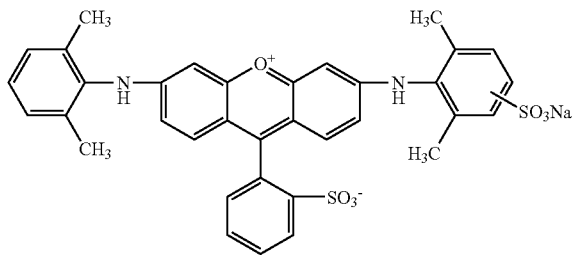

Such C. I. Acid Red 289 dyes are generally commercially available under the trade names of IJ Red 319H from Daiwa Dyestuff Mfg. Co., Ltd. and Kayaset Magenta J-41A from Nippon Kayaku Co., Ltd. These commercially available C. I. Acid Red 289 dyes show similar results in liquid chromatography under the aforementioned conditions as shown in FIG. 1.

The area A of the major peak and the total area B of peaks at retention times of 1.2 or more provided that the retention time of the major peak is 1, are areas measured in liquid chromatography under the aforementioned conditions. In the liquid chromatogram of FIG. 1, the major peak at a measured retention time of 1.02 to 1.10 minute may be derived from a monosulfonic acid derivative and peaks detected at measured retention times of 1.20 minutes or more may be derived from a disulfonic acid derivative, mono- or di-sulfonic acid derivative and the like having substituents at different positions. The measured data of FIG. 1 shows that the ratio (A/B) of A to B is 1.07 provided that the retention time of the major peak is 1.

The dye was purified and the resulting purified sample was subjected to the liquid chromatography under the above conditions. The result is shown in FIG. 2.

Figure 2:
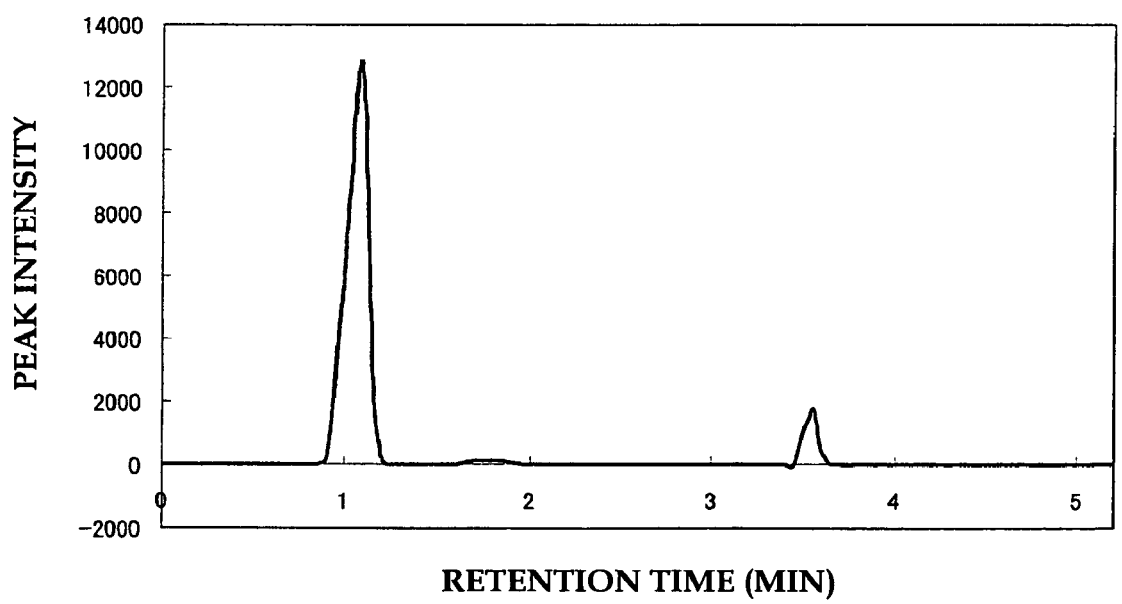
FIG. 2 is a liquid chromatograph of a purified product of the commercially available C. I. Acid Red 289 purified by a preparative thin-layer chromatography.

The data of FIG. 2 show that the ratio A/B is 7.33 provided that the retention time of the major peak is 1. The dye can be purified typically by salt precipitation, in which the dye is dissolved in water and thereafter a salt such as sodium chloride is added to the solution to thereby re-precipitate the dye; acid precipitation, in which the dye is dissolved in water and an acid such as hydrochloric acid, sulfuric acid or the like is added to the solution to thereby precipitate the dye as a free acid; reprecipitation in which the dye is dissolved in N,N-dimethylsulfoamide, and thereafter the solution is added to acetone or acetone-ethanol mixture to thereby re-precipitate the dye; washing in which the dye is washed with an alcohol solvent such as ethanol; column chromatography; and preparative thin-layer chromatography. The preparative thin-layer chromatography using a sheet was used herein.

Inks were prepared from the dyes before and after purification and their water resistance was determined. As a result, both of the ink alone and the ink further comprising a water-soluble substance capable of undergoing polycondensation along with vaporization of water show improved water resistance after purification.

The ink-jet recording ink according to the third aspect of the present invention comprises at least a colorant, a moisturizer, water, a water-soluble substance capable of undergoing polycondensation along with vaporization of water, and a pH buffer.

The present inventors have found that, by further incorporating a pH buffer into an ink, the ink-jet recording ink has a pH within suitable ranges in a long period of time, shows a less variation in pH from the initial pH and a high dissolution stability even after long-term storage or even in use under various conditions, does not invite clogging and has satisfactory water resistance.

The ink-jet recording ink according to this aspect comprises a pH buffer in addition to a colorant, a moisturizer, water, and a water-soluble substance capable of undergoing polycondensation along with vaporization of water. Examples of the pH buffer are N-(2-acetylamido)-2-aminoethanesulfonic acid (pH 6.0-7.5), N-(2-acetamide)iminodiacetic acid (pH 5.8-7.4), N,N-bis(2-hydroxyethyl)-2-aminoethanesulfonic acid (pH 6.6-8.0), N,N-bis(2-hydroxyethyl) glycine (pH 7.7-9.1), bis(2-hydroxyethyl)iminotris(hydroxymethyl)methane (pH 5.3-7.3), N-cyclohexyl-3-aminopropanesulfonic acid (pH 9.7-11.1), N-cyclohexyl-2-hydroxy-3-aminopropanesulfonic acid (pH 9.3-10.7), N-cyclohexyl-2-aminoethanesulfonic acid (pH 8.6-10.0), 3-[N,N-bis(2-hydroxyethyl)amino]-2-hydroxypropanesulfonic acid (pH 6.9-8.1), 3-[4-(2-hydroxyethyl)-1-piperazinyl]propanesulfonic acid (pH 7.5-8.5), 2-[4-(2-hydroxyethyl)-1-piperazinyl]ethanesulfonic acid (pH 6.8-8.2), 2-hydroxy-3-[4-(2-hydroxyethyl)-1-piperazinyl]propanesulfonic acid (pH 7.4-8.6), 2-morpholinoethanesulfonic acid (pH 5.5-7.0), 3-morpholinopropanesulfonic acid (pH 6.5-7.9), piperazine-1,4-bis(2-hydroxy-3-propanesulfonic acid) (pH 7.2-8.5), N-tris(hydroxymethyl)methyl-3-aminopropanesulfonic acid (pH 7.7-9.1), 2-hydroxy-N-tris(hydroxymethyl)methyl-3-aminopropanesulfonic acid (pH 7.0-8.2), N-tris(hydroxymethyl)methyl-2-aminoethanesulfonic acid (pH 6.8-8.2), and N-[tris(hydroxymethyl)methyl]glycine (pH 7.8-8.8). The pH values in the parentheses are applicable pH ranges.

The content of the pH buffer in the ink-jet recording ink is preferably from 0.01 to 10 percent by weight and more preferably from 0.1 to 5.0 percent by weight based on the total weight of the ink. If the content is less than 0.01 percent by weight, the pH buffer may not sufficiently work to control pH stably. If it exceeds 10 percent by weight, the pH buffer may adversely affect the solubility of a dye or the dispersion stability of a pigment.

To improve the water resistance, an organosilicon compound capable of undergoing polycondensation is used herein. The pH of the ink-jet recording ink is preferably controlled within a range from 8.0 to 11.0, while a suitable pH at which the components do not aggregate varies depending on the dye combined. If the pH is lower than 8.0, aggregation may occur in some combinations of the organosilicon compound and the dye. If the pH exceeds 11.0, the ink may not have sufficient safety in handling. Under the present invention, preferred pH buffers for controlling the pH of the ink within a range of 8.0 to 11.0 are N,N-bis(2-hydroxyethyl)glycine (pH 7.7-9.1), N-cyclohexyl-3-aminopropanesulfonic acid (pH 9.7-11.1), N-cyclohexyl-2-hydroxy-3-aminopropanesulfonic acid (pH 9.3-10.7), N-cyclohexyl-2-aminoethanesulfonic acid (pH 8.6-10.0), N-tris(hydroxymethyl)methyl-3-aminopropanesulfonic acid (pH 7.7-9.1), N-[tris(hydroxymethyl)methyl]glycine (pH 7.8-8.8), and the like.

The image forming method according to the fourth aspect of the present invention comprises discharging an ink-jet recording ink through a nozzle to a print medium having a surface treated with a cationic surface sizing agent, in which the ink-jet recording ink comprises an anionic-group-containing colorant, a moisturizer, water and a water-soluble substance capable of undergoing polycondensation along with vaporization of water. When an ink droplet is applied to the print medium, the cationic surface sizing agent reacts with the anionic group of the colorant to thereby secure the colorant onto the print medium. Then, the water-soluble substance undergoes polycondensation on the print medium, and the polycondensate securely surrounds and secures the colorant. Thus, the water-soluble substance more reliably and effectively works to increase the water resistance of the image.

By using plain-paper-like print medium comprising plain paper having a surface treated with a cationic surface sizing agent, images with high water resistance can be easily produced even with the use of a water-based ink, in contrast to conventional equivalents using plain paper.

The water-soluble substance capable of undergoing polycondensation along with vaporization of water is preferably at least one organosilicon compound. The organosilicon compound is very preferable to increase the water resistance and can serve to effectively yield the operation and advantages of the present invention.

The cationic surface sizing agent is preferably at least one synthetic resin sizing agent. The synthetic resin cationic surface sizing agent further satisfactorily reacts with anionic group of the colorant to thereby secure the colorant onto the print medium. Thus, the water-soluble substance more reliably and effectively works to increase the water resistance of the image.

The cationic surface sizing agent preferably mainly comprises one of alkylketene dimers, styrenic resins, acrylic resins, styrene-acrylic copolymers and mixtures of them.

The cationic surface sizing agent mainly comprising such a synthetic resin can be prepared according to a conventional procedure. For example, copolymerizing a hydrophobic monomer such as styrene with an amino-containing monomer such as dimethylaminoethyl methacrylate and then dissolving or dispersing the resulting copolymer in water with the use of a water-soluble acid or an agent for converting into a quaternary compound can yield a cationic sizing agent having a concentration of about 20 percent by weight.

The cationic surface sizing agent can also be any of sizing agents described in Tables for sizing agents in Paper Pulp Technology Times, Extra Ed., pp. 182-185 (2001), Shigyo Times Co., Ltd.

Thus, when the ink droplet is applied to the print medium, the cationic surface sizing agent reacts with the anionic group of the anionic-group-containing colorant and secures the colorant onto the print medium, and thereby the water-soluble substance more reliably and effectively works to increase the water resistance of images.

Figure 3:
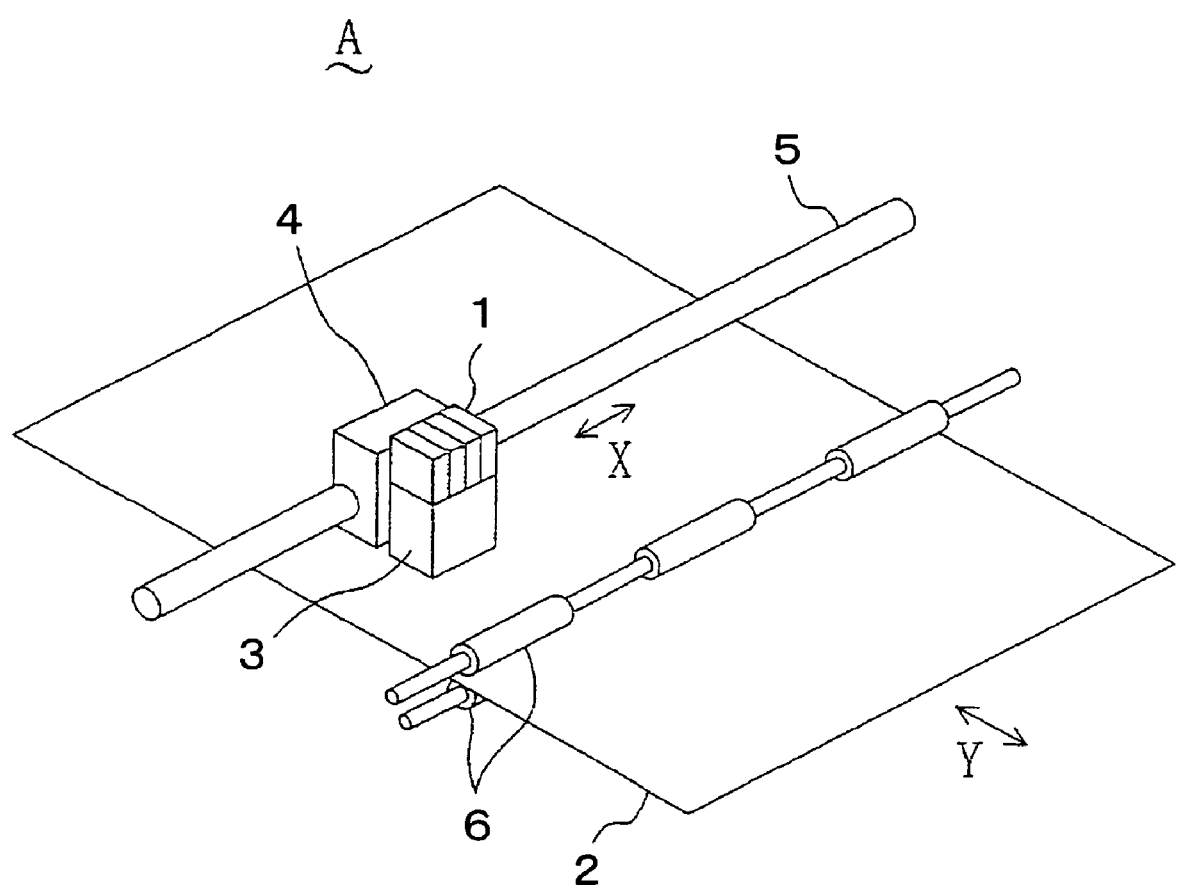
FIG. 3 is a schematic perspective view of an ink-jet recording apparatus using an ink-jet recording ink according to an embodiment of the present invention.

A recording apparatus A has an ink-jet head 3. The ink-jet head 3 has an ink cartridge 1 housing the above-mentioned ink on the top face thereof and discharges the ink to recording paper 2 serving as a recording medium as will be described later. The ink-jet head 3 is supported and secured to a carriage 4, and this carriage 4 is supported by a carriage shaft 5 extending in a main scanning direction (X-direction shown in FIGS. 3 and 4). A carriage motor (not shown) is installed in the carriage 4, and this carriage motor allows the ink-jet head 3 and the carriage 4 to reciprocally move in the main scanning direction while being guided by the carriage shaft 5. The carriage 4, the carriage shaft 5 and the carriage motor transport the ink-jet head 3 and the recording paper 2 relatively to each other in the main scanning direction.

The above-mentioned recording paper 2 is sandwiched by two transporting rollers 6 that are driven to rotate by a transporting motor (not shown) and this transporting motor and the respective transporting rollers 6 transport the recording paper 2 in a sub-scanning direction (Y-direction shown in FIGS. 3 and 4) perpendicular to the main scanning direction below the ink-jet head 3. In this manner, the respective transporting rollers 6 and the transporting motor transport the ink-jet head 3 and the recording paper 2 relatively to each other in the sub-scanning direction.

Figure 4:
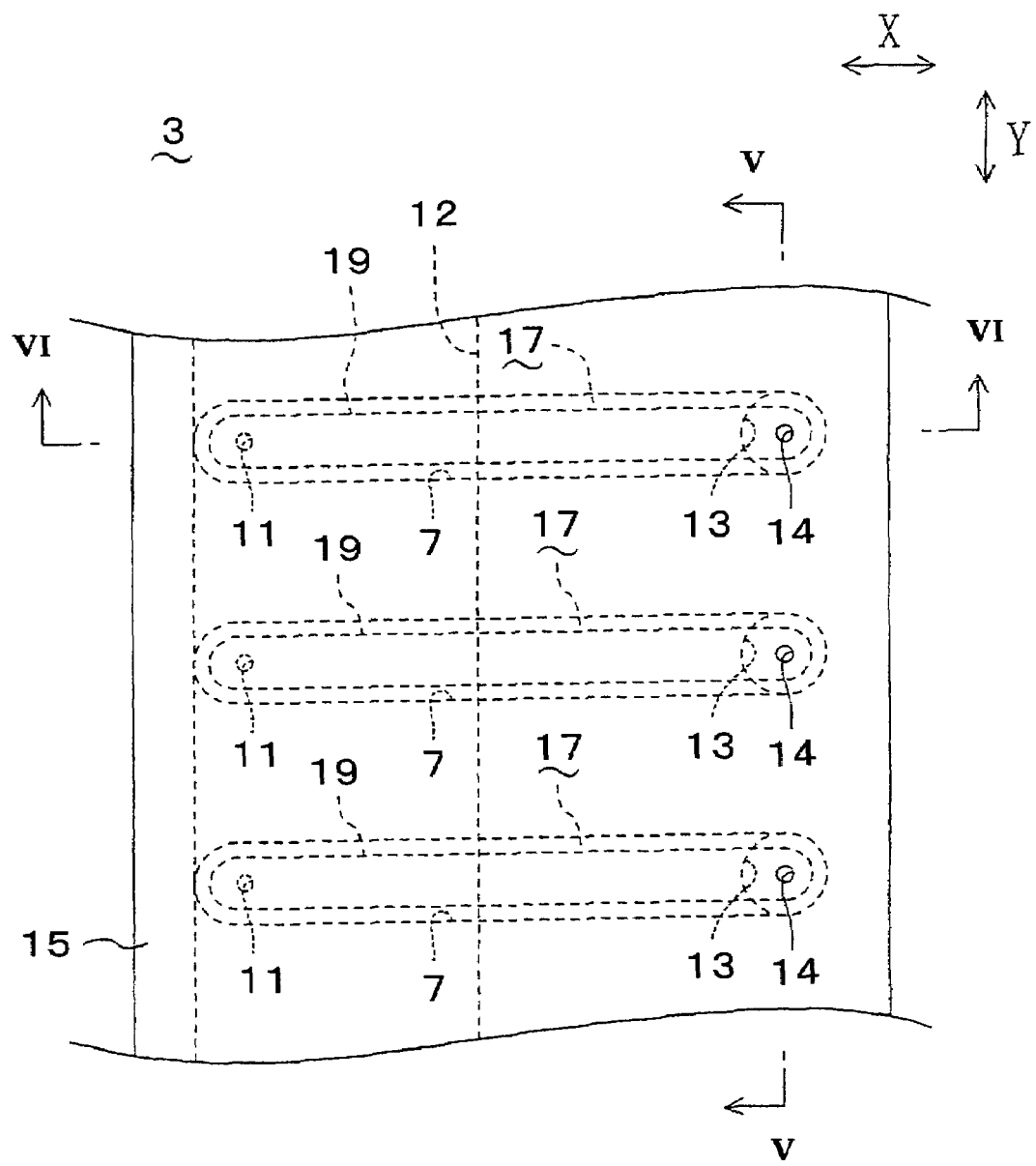
FIG. 4 is a partial bottom view of an ink-jet head of an ink-jet color recording apparatus.
Figure 5:
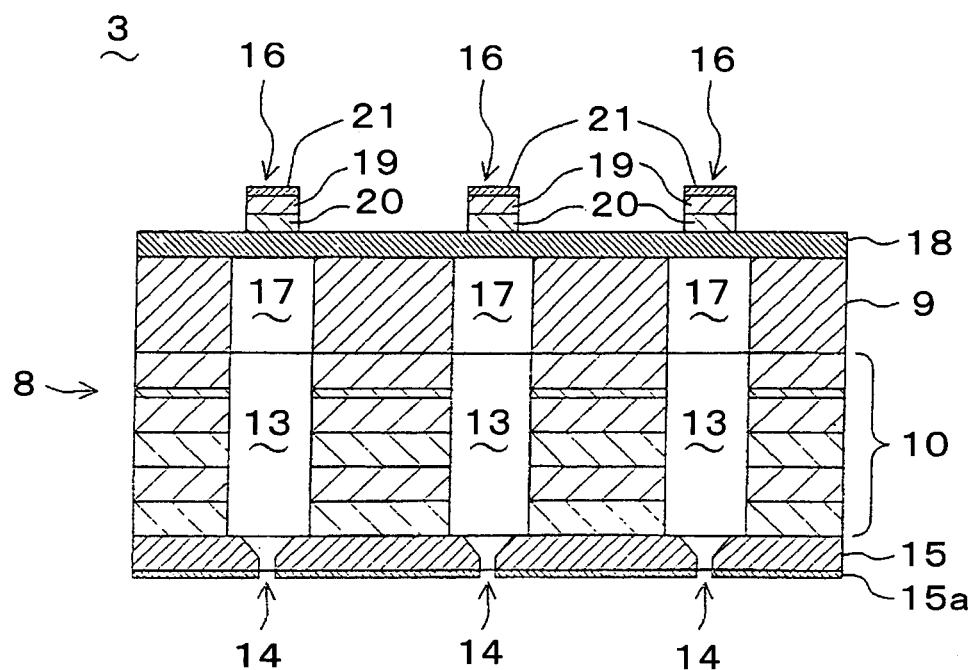
FIG. 5 is a cross sectional view taken along the line V-V in FIG. 4.
Figure 6:
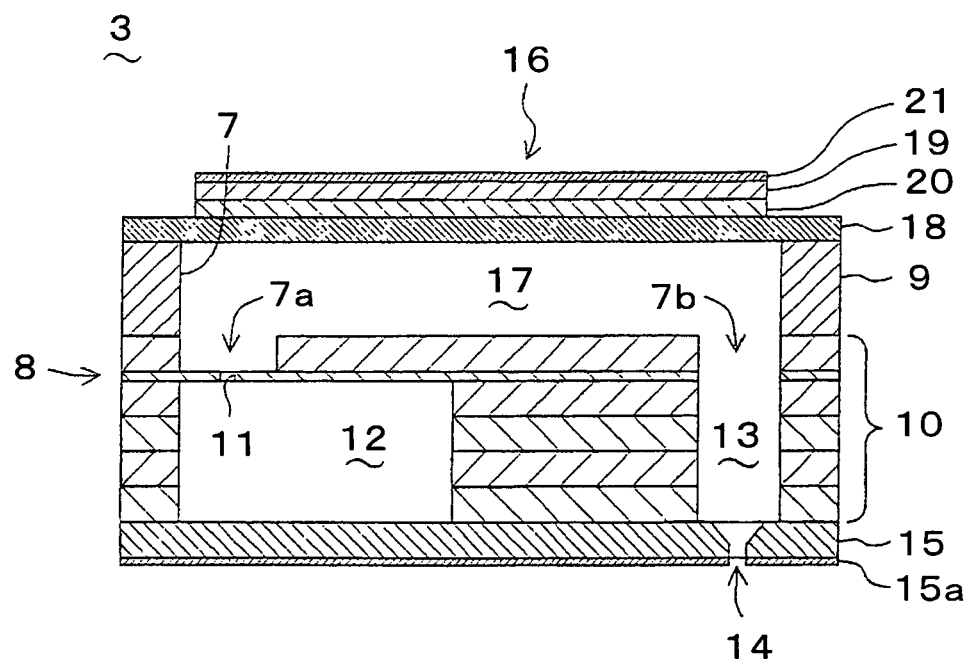
FIG. 6 is a cross sectional view taken along the line VI-VI in FIG. 4.

As shown in FIGS. 4 to 6, the ink-jet head 3 has a head main body 8 in which a plurality of pressure-chamber concave portions 7, each having a supply port 7a for supplying ink and a discharge port 7b for discharging ink, are arranged. The respective concave portions 7 of this head main body 8 have openings that are placed in a manner so as to extend on the top face of the head main body 8 in the main scanning direction; thus, the openings are aligned side by side with virtually the same intervals from each other in the sub-scanning direction. The overall length of each of the openings of the above-mentioned concave portions 7 is set at, for example, approximately 1250 μm with the width thereof being set at, for example, approximately 130 μm. Both of the end portions of the opening of each concave portion 7 have a virtually semicircular shape.

The side wall of each concave portion 7 of the head main body 8 is formed by a pressure chamber part 9 made of photosensitive glass about 200 μm thick. The bottom wall of each concave portion 7 is formed by an ink passage part 10 that is made by laminating six sheets of stainless steel thin plates, and bonded and secured to the underside of the pressure chamber part 9. In the ink passage part 10, there are arranged a plurality of orifices 11, an ink-supply passage 12 (one in number), and a plurality of ink-discharge passages 13. The orifices 11 are respectively connected to the supply ports 7a of the respective concave portions 7; the ink-supply passage 12 is connected to the respective orifices 11 and extends in the sub-scanning direction; and the ink-discharge passages 13 are connected to the respective discharge ports 7b.

The respective orifices 11 are arranged in a stainless steel thin plate that is placed on the second level from the top and has a thickness smaller than the other plates in the ink passage part 10, and the diameter thereof is set at approximately 38 µm. The ink-supply passage 12 is connected to the ink cartridge 1 so that the ink cartridge 1 supplies the ink into the ink-supply passage 12.

A nozzle plate 15, made of stainless steel, is bonded and secured to the underside of the ink passage part 10, and the underside of the nozzle plate 15 is coated with a water repellent film 15a. In the nozzle plate 15, a plurality of nozzles 14, used for discharging ink droplets to the recording paper 2, are arranged on the underside of the ink-jet head 3 so as to be aligned in a row in the above-mentioned sub-scanning direction. The nozzles 14 are respectively connected to the ink-discharge passages 13 so as to communicate with the discharge ports 7b of the respective concave portions 7 through the ink-discharge passages 13. Each of the nozzles 14 comprises a tapered portion having a nozzle diameter that is narrowed toward the nozzle top and a straight portion that is continuously arranged on the nozzle top of the tapered portion, and the nozzle diameter of the straight portion is set at approximately 20 µm.

Piezoelectric actuators 16 are attached to upper sides of the respective concave portions 7 of the head main body 8. Each piezoelectric actuator 16 has a vibration plate 18, made of Cr, that covers each concave portion 7 of the head main body 8 while being bonded and secured to the upper face of the head main body 8 so as to form a pressure chamber 17 in cooperation with the concave portion 7. This vibration plate 18 is prepared as a single member commonly used for all the piezoelectric actuators 16, and also serves as a common electrode commonly used for all piezoelectric elements 19, which will be described later.

Each of the piezoelectric actuators 16 has a piezoelectric element 19 and an individual electrode 21. The piezoelectric element 19 is made of lead zirconate titanate (PZT) and is arranged on the top face of the vibration plate 18 opposite to the pressure chamber 17 with the interposition of an interlayer 20 made of Cu. The piezoelectric element 19 is arranged in a region corresponding to the pressure chamber 17, i.e., in a region corresponding to the opening of the concave portion 7. The individual electrode 21 is made of Pt, is joined to the top face of each piezoelectric element 19 opposite to the vibration plate 18 and is used for applying a voltage (driving voltage) to the respective piezoelectric elements 19 together with the vibration plate 18.

All the vibration plate 18, the piezoelectric elements 19, the individual electrodes 21 and the interlayers 20 are made of thin films; and the thickness of the vibration plate 18 is set at approximately 6 µm, the thickness of each piezoelectric element 19 is set at 8 µm or less (for example, approximately 3 µm), the thickness of each individual electrode 21 is set at approximately 0.2 µm, and the thickness of each interlayer 20 is set at approximately 3 µm.

The piezoelectric actuators 16 apply a driving voltage to each piezoelectric element 19 through the vibration plate 18, each interlayer 20 and each individual electrode 21 so that the vibration plate 18 is deformed at portions (openings of the concave portions 7) corresponding to the pressure chambers 17; thus, the ink, housed inside the pressure chamber 17, is discharged through the discharge port 7b, that is, the nozzles 14. In other words, when a pulse-shaped voltage is applied between the vibration plate 18 and the individual electrodes 21, the piezoelectric element 19 is allowed to shrink in a width direction perpendicular to its thickness direction because of its piezoelectric effect upon receipt of a rise of the pulse voltage, while the vibration plate 18, the individual electrodes 21 and the interlayers 20 are not allowed to shrink; therefore, the portions of the vibration plate 18 corresponding to the pressure chambers 17 are deformed to be distorted in a convex shape toward the pressure chamber 17, due to a so-called bimetal effect. This deformation causes the pressure inside the pressure chamber 17 so that the pressure pushes out the ink inside the pressure chamber 17 from the nozzles 14 through the discharge port 7b and ink-discharge passages 13. Then, upon receipt of the fall of the above-mentioned pulse voltage, the piezoelectric element 19 is allowed to extend so that the portions of the vibration plate 18 corresponding to the pressure chambers 17 return to the original state, and at this time, the ink that is being pushed out through the nozzle 14 is cut off from ink located inside the ink-discharge passage 13, is discharged onto the recording paper 2 as ink droplets each having a volume of, for example, 3 picoliters, and adheres to the surface of the recording paper 2 in a dot format. When the vibration plate 18 returns to its original state from the deformed state distorted into the convex shape, the pressure chambers 17 are filled with ink that is supplied from the ink cartridge 1 through the ink-supply passages 12 and the supply ports 7a.

The pulse voltage to be applied to each piezoelectric element 19 is not limited to the push-and-pull type and can be of the pull-and-push type, in which, after having dropped from a first voltage to a second voltage that is lower than the first voltage, the voltage is allowed to rise to the first voltage.

The application of the driving voltage to the respective piezoelectric elements 19 is carried out every predetermined period of time (for example, approximately 50 µs: driving frequency 20 kHz) when the ink-jet head 3 and the carriage 4 are being shifted in the main scanning direction from one end to the other end of the recording paper 2 at a virtually constant speed (However, when the ink-jet head 3 has reached a portion of the recording paper 2 to which the ink droplet is not applied, the voltage is no longer applied.). Thus, the ink droplet is put at a predetermined position of the recording paper 2. Upon completion of the recording process corresponding to one scanning process, the recording paper 2 is transported in the sub-scanning direction by a predetermined length by the transporting motor and the transporting rollers 6, and while the ink-jet head 3 and the carriage 4 are again being shifted in the main scanning direction, the ink droplets are discharged so as to carry out a recording process corresponding to a new scanning process. By repeating these operations, a desired image is formed on the entire surface of the recording paper 2.

The ink to be used in the recording apparatus A comprises a colorant, a moisturizer for suppressing drying typically in the nozzles 14 and the like of the ink-jet head 3, water, and an organosilicon compound as a water-soluble substance capable of undergoing polycondensation along with vaporization of water, i.e., a water-soluble substance that is polycondensed in the absence of water.

After the ink droplets have been discharged from the nozzles 14 of the ink-jet head 3 and have adhered to the recording paper 2, water (solvent) in the ink droplets evaporates or permeates into the recording paper 2. At this time, the organosilicon compound undergoes polycondensation on the recording paper 2 and surrounds the colorant so as to prevent the colorant from bleeding out into water even when an image on the recording paper 2 gets wet with water, thus improving the water resistance of the image. The organosilicon compound is preferably prepared as a hydrolysate between an alkoxysilane containing an organic group having an amino group and an alkoxysilane containing no amino group, or an organic silicon compound that is prepared by hydrolyzing a hydrolyzable silane and a hydrolyzable silane which contains no nitrogen atoms. Hereinabove, the former hydrolyzable silane has been prepared by allowing an organic mono-epoxy compound to react with a hydrolyzable silane containing an amino group.

The ink preferably further comprises a polycondensation promoter for accelerating the polycondensation of the organosilicon compound.

After the ink is applied to the recording medium such as paper, the contained polycondensation promoter works to accelerate the polycondensation of the organosilicon compound, and thereby the polycondensed product securely surrounds the colorant (a dye or a pigment). Even when an image gets wet with water immediately after being formed on the recording medium, the colorant therein does not bleed out into water since the colorant is surrounded by the polycondensed water-soluble substance. Thus, the image has significantly improved water resistance.

The polycondensation promoter is preferably at least one of inorganic ammonium salts and organic ammonium salts. The ammonium salts used herein also include ammonium ion $NH_4^+$ and substituted derivatives thereof, except for replacing its hydrogen(s) with a substituent R, wherein R is an alkyl, an aryl or another group. The ammonium salt dissociates and releases ammonia or amine on the recording medium, and the residual inorganic or organic acid works to accelerate the polycondensation of the water-soluble substance.

Among ammonium salts, those of weak acids are preferred for further higher water resistance. Alternatively, ammonium salts of strong acids are also preferred for further effective control of the pH of the ink, i.e., stably decreasing the pH.

Examples of ammonium salts of inorganic weak salts are ammonium dihydrogen phosphate, diammonium hydrogen phosphate, triammonium phosphate, ammonium diphosphite, ammonium carbonate, ammonium bicarbonate, ammonium sulfate, ammonium borate and ammonium borofluoride.

Examples of ammonium salts of organic weak acids are ammonium acetate, diammonium oxalate, ammonium hydrogen oxalate, ammonium benzoate, ammonium citrate, diammonium citrate, triammonium citrate, ammonium lactate, ammonium phthalate, ammonium succinate, ammonium tartrate, diammonium tartrate, and the like.

Examples of ammonium salts of inorganic strong acids are ammonium chloride, ammonium sulfate, ammonium hydrogen sulfate, ammonium sulfite, ammonium thiosulfate, ammonium nitrate, ammonium bromide, ammonium fluoride, ammonium iodide, and the like.

Examples of ammonium salts of organic strong acids are ammonium formate, ammonium monofluoroacetate, ammonium trifluoroacetate, ammonium trichloroacetate, and the like.

Specific examples of dyes as the colorant include: acidic dyes such as:
C. I. Acid Yellow 17, 23, 42, 44, 76, and 142;
C. I. Acid Red 1, 8, 13, 14, 18, 26, 27, 35, 37, 42, 52, 82, 87, 89, 92, 97, 106, 111, 114, 115, 134, 249, 254, and 289;
C. I. Acid Blue 9, 29, 45, and 92;
C. I. Acid Black 1, 2, 7, 24, 26, and 94;
direct dyes such as:
C. I. Direct Yellow 1, 12, 24, 26, 33, 44, 50, 86, 132, and 142;
C. I. Direct Red 1, 4, 13, 17, 20, 28, 31, 39, 80, 81, 83, 84, 225, and 227;
C. I. Direct Blue 1, 2, 6, 15, 22, 25, 71, 76, 78, 86, 163, 165, and 199;
C.I. Direct Black 19, 22, 32, 38, 51, 56, 74, 75, 77, 154, and 168.

By using any of these acidic dyes and direct dyes as the colorant, the ink has increased dissolution stability and obtains excellent effects including hue, water resistance and light resistance.

The content of the dye as the colorant in the ink is preferably from 0.5 to 25 percent by weight, and more preferably from 1 to 10 percent by weight based on the total weight of the ink.

Preferred examples of pigments as the colorant are as follows.

Suitable black pigments are pigments comprising carbon black having a surface treated with a diazonium salt or having a surface graft-polymerized with a polymer.

Suitable color pigments are those treated with a surfactant such as a formalin condensation product of naphthalene sulfonate, lignin sulfonic acid, dioctyl sulfosuccinate, polyoxyethylene alkyl amine, a fatty acid ester, or the like.

Specific examples of cyan pigments are C. I. Pigment Blue 15:3, Pigment Blue 15:4, aluminum phthalocyanine, and the like. Examples of magenta pigments are C. I. Pigment Red 122, Pigment Violet 19, and the like. Examples of yellow pigments are C. I. Pigment Yellow 74, Pigment Yellow 109, Pigment Yellow 110, Pigment Yellow 128, and the like. The content of the pigment as the colorant in the ink is preferably from 0.5 to 25 percent by weight and more preferably from 1 to 10 percent by weight based on the total weight of the ink.

Suitable examples of the moisturizer are polyhydric alcohols such as ethylene glycol, diethylene glycol, triethylene glycol, propylene glycol, 1,3-propanediol, polyethylene glycol, polypropylene glycol, 1,5-pentanediol, 1,6-hexanediol, 1,2,6-hexanetriol, 1,2,4-butanetriol, 1,2,3-butanetriol, 3-methyl-1,3,5-triol and glycerol; and water-soluble nitrogen-containing heterocyclic compounds such as 2-pyrrolidone, N-methyl-2-pyrrolidone and 1,3-dimethylimidazolidinone. The content of the moisturizer in the ink is preferably from 5 to 50 percent by weight and more preferably from 10 to 40 percent by weight based on the total weight of the ink.

The ink preferably further comprises a penetrating agent. Thus, the solvent in the ink containing the moisturizer, the penetrating agent and water rapidly penetrates into the recording medium such as paper after the ink is applied thereto. The water-soluble substance rapidly undergoes polycondensation and thereby securely surrounds the colorant (dye or pigment), resulting in further improved water resistance of the image.

Suitable examples of the penetrating agent are monoalkyl ethers of polyhydric alcohols, such as diethylene glycol monophenyl ether, ethylene glycol monophenyl ether, ethylene glycol butyl ether, ethylene glycol monoallyl ether, diethylene glycol monophenyl ether, diethylene glycol monobutyl ether, triethylene glycol monobutyl ether, tetraethylene glycol monobutyl ether and propylene glycol monobutyl ether. The content of the penetrating agent is preferably from 0.1 to 30 percent by weight and more preferably from 1.0 to 10 percent by weight based on the total weight of the ink. If the content is less than 0.1 percent by weight, the ink may not have a sufficiently low surface tension of 50 mN/m or less at 25° C. (to be described afterward) and may not sufficiently penetrate into the recording paper 2. In contrast, if it exceeds 30 percent by weight, the colorant and the organosilicon compound may not be sufficiently solved in water.

When the ink contains the penetrating agent, the surface tension of the ink at 25° C. is preferably set at 20 mN/m to 50 mN/m by controlling the content of the penetrating agent. If the surface tension is less than 20 mN/m, the droplets of the ink may not be satisfactorily formed when discharged from the nozzles 14. If it exceeds 50 mN/m, the ink may not satisfactorily penetrate into the recording paper 2. When the ink does not have a surface tension of about 20 mN/m even with the use of the penetrating agent, a fluorine-containing surfactant may be added as an auxiliary for the penetrating agent. Suitable examples of the fluorine-containing surfactant are ammonium salts of perfluoroalkylsulfonic acid, potassium salts of perfluoroalkylsulfonic acid and potassium salts of perfluoroalkylcarboxylic acid.

The ink-jet recording ink according to an embodiment of the present invention comprises a colorant, a moisturizer, water, an organosilicon compound as a water-soluble substance capable of undergoing polycondensation along with vaporization of water, and a polycondensation promoter.

When an image is formed on the recording paper 2 with this ink by using the ink-jet recording apparatus A, the solvent comprising the moisturizer and water rapidly penetrates into the recording paper 2 after ink droplets have been applied to the recording paper 2. Thereby, the colorant, the organosilicon compound and the polycondensation promoter remain on the recording paper 2. Then, the organosilicon compound undergoes polycondensation and surrounds the colorant. At this time, the polycondensation promoter on the recording paper 2 dissociates or decomposes to yield an acid, and the produced acid works to accelerate the polycondensation of the organosilicon compound to complete. As a result, the organosilicon compound rapidly and securely surrounds the colorant. The image thereby has significantly increased water resistance regardless of the type of the colorant even immediately after image formation.

In the present embodiment, an organosilicon compound is used as the water-soluble substance capable of undergoing polycondensation along with vaporization of water. However, any substance can be used, as long as it can undergo polycondensation and surround the colorant when the discharged ink droplets are attached to the recording paper and the water (solvent) vaporizes or penetrates into the recording paper.

The print medium 2 can be prepared by applying a sizing composition containing a cationic surface sizing agent to a commercially available plain paper to an amount of 0.1 g/m² to 10 g/m² in terms of solid content using a wire bar, and by drying the applied film using a dryer.

In commercial production, the print medium 2 can be produced by using a paper-making machine having a surface size press such as gate roll or SymSizer.

The plain-paper-like print medium for use in the present invention can be prepared according to a production procedure as in regular plain paper, is inexpensive and versatile, can yield an image with high water resistance in combination with the image forming method of the present invention, and thereby has significantly high added values.

The amount of the cationic surface sizing agent in terms of solid contents is preferably from 0.1 g/m² to 10 g/m² and more preferably from 0.5 g/m² to 5 g/m². If the amount is less than 0.1 g/m², the water resistance may not be sufficiently improved. If it exceeds 10 g/m², the print medium may lose its plain-paper-like properties, thus increasing cost.

The plain paper can be any of commercially available plain paper such as versatile paper for electrophotography and versatile printer paper and other plain paper. Among them, common paper (commercially more available recently) for electrophotography and ink-jet recording is more preferred.

Examples of the cationic synthetic resin surface sizing agent are as follows, but any cationic surface sizing agent can be used.

| Trade name | Main polymeric component | Available from |
| --- | --- | --- |
| Sizepine K-903 | alkylketene dimer | Arakawa Chemical Industries, Ltd. |
| Sizepine K-287 | alkylketene dimer | Arakawa Chemical Industries, Ltd. |
| N-PPS | special synthetic resin | Arakawa Chemical Industries, Ltd. |
| "Bandless-size" BLS-5600 | alkylketene dimer | Misawa Ceramics Corp. |
| HARSIZE CP-800 | synthetic polymer | Harima Chemicals, Inc. |
| Basoplast 250D | acrylic polymer | BASF Japan Ltd. |
| Basoplast 265D | styrenic polymer | " |
| Pearlgum LS | styrene-acrylic resin | Seiko PMC Corporation |
| Pearlgum CT-61-20 | styrene-acrylic resin | Seiko PMC Corporation |
| NC Size C-25 | styrenic resin | Nicca Chemical Co., Ltd. |
| Sizing agent AS 211 | alkylketene dimer | Seiko PMC Corporation |
| Surface sizing agent SS 331 | styrenic resin | Seiko PMC Corporation |
| Polymaron 360 | styrenic resin | Seiko PMC Corporation |
| NS-18 | styrene-acrylic resin | Kindai Kagaku Kogyo Co., Ltd. |
| NSK-370 | alkylketene dimer | Kindai Kagaku Kogyo Co., Ltd. |
| "Fireless-size" K-270 | styrene-acrylic resin | Kindai Kagaku Kogyo Co., Ltd. |

These cationic surface sizing agents react with the anionic group of the colorant and secure the anionic-group-containing colorant onto the print medium.

EXAMPLE

The present invention will be illustrated in further detail with reference to several examples and comparative examples below, which are not intended to limit the scope of the present invention.

In the following examples, two organosilicon compounds prepared in the following manner were used as the water-soluble substance capable of undergoing polycondensation along with vaporization of water.

Organosilicon Compound (A)

In a 200-ml reactor equipped with a stirrer, a thermometer and a condenser was placed and stirred 120 g (6.67 mol) of water. A mixture of 44.4 g (0.2 mol) of $H_2NCH_2CH_2NHCH_2CH_2CH_2Si(OCH_3)_3$ and 15.2 g (0.1 mol) of $Si(OCH_3)_4$ was added dropwise to the water at room temperature for 10 minutes, whereas the internal temperature rose from 25° C. to 56° C. The mixture was further stirred on an oil bath at 60° C. to 70° C. for 1 hour. An ester adapter was attached to the reactor, the internal temperature was raised to 98° C., and by-produced methanol was removed, to yield 137 g of an aqueous solution of an organosilicon compound having a nonvolatile content of 27.3% (105° C., 3 hours).

Organosilicon Compound (B)

In a 200-ml reactor equipped with a stirrer, a thermometer and a condenser was placed 100 g (0.56 mol) of $(CH_3O)_3SiCH_2CH_2CH_2NH_2$ and was heated to 80° C. with stirring. A total of 62.2 g (0.84 mol) of 2,3-epoxy-1-propanol was added dropwise for 1 hour. The mixture was further stirred at 80° C. for 5 hours to allow the reaction between amino groups and epoxy groups, followed by distilling off low-molecular-weight fractions at 80° C. under a reduced pressure of 10 mmHg, to yield a hydrolyzable silane. In a 200-ml reactor equipped with a stirrer, a thermometer and a condenser was placed and stirred 120 g (6.67 mol) of water. A mixture of 50.6 g (0.2 mol) of the hydrolyzable silane and 13.6 g (0.1 mol) of $CH_3Si(OCH_3)_3$ was added dropwise thereto at room temperature for 10 minutes, whereas the internal temperature rose from 25° C. to 36° C. The mixture was further stirred on an oil bath at a heating temperature of 60° C. to 70° C. for 1 hour. Thereafter, an ester adapter was attached to the reactor, the internal temperature was raised to 98° C., and by-produced methanol was removed, to yield 152 g of an aqueous solution of an organosilicon compound having a nonvolatile content of 25.3% (105° C., 3 hours).

Examples A Corresponding to the Second Aspect of the Present Invention

A dye was purified in the following manner. A commercially available dye was dissolved in methanol, was applied in a band to a PLC sheet (preparative thin-layer chromatography sheet available from MERCK, silica gel 60) 2 mm thick, was developed with an eluent comprising 55 parts by weight of ethanol, 40 parts by weight of ethyl acetate, 5 parts by weight of water and 0.2 part by weight of nitrate of triethylamine, and a major spot fraction of the dye was fractionated. More specifically, silica gel corresponding to the major spot was scraped, the dye was extracted with methanol, was concentrated, was washed with a small amount of ethanol and thereby yielded a purified dye. A dye sample having a high areal ratio of the major spot was further subjected to repetitive fractionation.

Six ink-jet recording inks having the following compositions were prepared. The contents of components are percent by weight.

Example A-1

| | |
|---|---|
| Purified product of C. I. Acid Red 289 (areal ratio of A to B: 4.55) | 4% |
| Glycerol | 7% |
| Diethylene glycol | 5% |
| Diethylene glycol monobutyl ether | 5% |
| Deionized water | 79% |

Example A-2

| | |
|---|---|
| Purified product of C. I. Acid Red 289 (areal ratio of A to B: 7.33) | 4% |
| Glycerol | 7% |
| Diethylene glycol | 5% |
| Diethylene glycol monobutyl ether | 5% |
| Deionized water | 79% |

Example A-3

| | |
|---|---|
| Purified product of C. I. Acid Red 289 (areal ratio of A to B: 4.55) | 4% |
| Glycerol | 7% |
| Diethylene glycol | 5% |
| Diethylene glycol monobutyl ether | 5% |
| Organosilicon Compound (A) | 18.3% |
| Diammonium hydrogen phosphate | 4% |
| Deionized water | 56.7% |

Example A-4

| | |
|---|---|
| Purified product of C. I. Acid Red 289 (areal ratio of A to B: 7.33) | 4% |
| Glycerol | 7% |
| Diethylene glycol | 5% |
| Diethylene glycol monobutyl ether | 5% |
| Organosilicon Compound (A) | 18.3% |
| Diammonium hydrogen phosphate | 4% |
| Deionized water | 56.7% |

Example A-5

| | |
|---|---|
| Purified product of C. I. Acid Red 289 (areal ratio of A to B: 4.55) | 4% |
| Glycerol | 7% |
| Diethylene glycol | 5% |
| Diethylene glycol monobutyl ether | 5% |
| Organosilicon Compound (B) | 19.8% |
| Ammonium carbonate | 4% |
| Deionized water | 55.2% |

Example A-6

| | |
|---|---|
| Purified product of C. I. Acid Red 289 (areal ratio of A to B: 7.33) | 4% |
| Glycerol | 7% |
| Diethylene glycol | 5% |
| Diethylene glycol monobutyl ether | 5% |
| Organosilicon Compound (B) | 19.8% |
| Ammonium carbonate | 4% |
| Deionized water | 55.2% |

Comparative Example A-1

| | |
|---|---|
| C. I. Acid Red 289 (IJ Red 319H; Daiwa Dyestuff Mfg. Co., Ltd.) (areal ratio of A to B: 1.07) | 4% |
| Glycerol | 7% |
| Diethylene glycol | 5% |
| Diethylene glycol monobutyl ether | 5% |
| Deionized water | 79% |

Comparative Example A-2

| | |
|---|---|
| C. I. Acid Red 289 (IJ Red 319H; Daiwa Dyestuff Mfg. Co., Ltd.) (areal ratio of A to B: 1.07) | 4% |
| Glycerol | 7% |
| Diethylene glycol | 5% |
| Diethylene glycol monobutyl ether | 5% |
| Organosilicon Compound (A) | 18.3% |
| Diammonium hydrogen phosphate | 4% |
| Deionized water | 56.7% |

Tables A-1 and A-2 show the results of the inks according to Examples A-1 through A-6 and Comparative Examples A-1 and A-2 in a water resistance test.

The water resistance was determined based on the percentage of the optical density of a print sample after the water resistance test to that before the test.

More specifically, a sample ink was attached to Recording Apparatus A, and a 15 mm square solid image was printed on plain paper Xerox 4024 (trade name, from Xerox Limited), to yield the print sample. In the water resistance test, the print sample was immersed in distilled water for 5 minutes in such a manner that the printed side was downward. After the immersing, the print sample was air-dried for 30 minutes and the optical density thereof was determined.

TABLE A-1

| | Areal ratio of A to B | Water resistance |
|---|---|---|
| Example A-1 | 4.55 | 77% |
| Example A-2 | 7.33 | 79% |
| Com. Ex. A-1 | 1.07 | 69% |

The inks herein contain no organosilicon compound.

TABLE A-2

| | Areal ratio of major spot in thin-layer chromatography | Water resistance |
|---|---|---|
| Example A-3 | 4.55 | 98% |
| Example A-4 | 7.33 | 99% |
| Example A-5 | 4.55 | 98% |
| Example A-6 | 7.33 | 99% |
| Com. Ex. A-2 | 1.07 | 92% |

The inks herein contain an organosilicon compound.

These results show that, by using a C. I. Acid Red 289 dye having an areal ratio of a major spot to the total area of spots in thin-layer chromatography of 0.8 or more instead of a conventional Acid Red 289 dye, the inks have higher water resistance. Furthermore, when being used in combination with a water-soluble substance capable of undergoing polycondensation along with vaporization of water, the inks can produce images without bleed even in the water resistance test.

Table A-1 and FIGS. 1 and 2 show that the inks according to the second aspect of the present invention using specific C. I. Acid Red 289 dye can produce images which are free of fading even when left in a long period of time and have excellent water resistance when printed on plain paper.

Examples B Corresponding to the First Aspect of the Present Invention

Six ink-jet recording inks having the following compositions were prepared. The contents of components are percent by weight.

Example B-1

| | |
|---|---|
| C. I. Acid Black 194 (Basacid Black × 40; BASF AG) | 45% |
| Glycerol | 7% |
| Diethylene glycol | 5% |
| Organosilicon Compound (A) | 18.3% |
| Deionized water | 24.7% |

Example B-2

| | |
|---|---|
| C. I. Acid Black 194 (Basacid Black × 40 liquid as 10% solution; BASF AG) | 45% |
| Glycerol | 7% |
| Diethylene glycol | 5% |
| Organosilicon Compound (A) | 18.3% |
| Diammonium hydrogen phosphate | 4% |
| Deionized water | 20.7% |

Example B-3

| | |
|---|---|
| C. I. Reactive Black 31 (Black KRL-SF liquid as 10% solution; Clariant) | 45% |
| Glycerol | 7% |
| Diethylene glycol | 5% |
| Organosilicon Compound (A) | 18.3% |
| Ammonium carbonate | 4% |
| Deionized water | 20.7% |

Example B-4

| | |
|---|---|
| C. I. Reactive Black 31 (Black KRL-SF liquid as 10% solution; Clariant) | 45% |
| Glycerol | 7% |
| Diethylene glycol | 5% |
| Diethylene glycol monobutyl ether | 5% |
| Organosilicon Compound (A) | 18.3% |
| Ammonium chloride | 4% |
| Deionized water | 15.7% |

Example B-5

| | |
|---|---|
| C. I. Acid Black 194 (Basacid Black × 40; BASF AG) | 45% |
| Glycerol | 7% |
| Diethylene glycol | 5% |
| Diethylene glycol monobutyl ether | 5% |
| Organosilicon Compound (B) | 19.8% |
| Ammonium nitrate | 4% |
| Deionized water | 14.2% |

Example B-6

| | |
|---|---|
| C. I. Reactive Black 31 (Black KRL-SF liquid as 10% solution; Clariant) | 45% |
| Glycerol | 7% |
| Diethylene glycol | 5% |
| Diethylene glycol monobutyl ether | 5% |
| Organosilicon Compound (B) | 19.8% |
| Ammonium borate | 5% |
| Deionized water | 13.2% |

Comparative Example B-1

| | |
|---|---|
| C. I. Direct Black 168 (Direct Black HEF-SF liquid as 10% solution; Clariant) | 45% |
| Glycerol | 7% |
| Diethylene glycol | 5% |
| Diethylene glycol monobutyl ether | 5% |
| Organosilicon Compound (A) | 18.3% |
| Diammonium hydrogen phosphate | 4% |
| Deionized water | 15.7% |

Comparative Example B-2

| | |
|---|---|
| C. I. Direct Black 195 (Pro-jet Fast Black 2 as 10% solution; Avecia Ltd.) | 45% |
| Glycerol | 7% |
| Diethylene glycol | 5% |
| Diethylene glycol monobutyl ether | 5% |
| Organosilicon Compound (B) | 19.8% |
| Ammonium borate | 4% |
| Deionized water | 14.2% |

The water resistance and pH of the inks according to Examples B-1 through B-6 and Comparative Examples B-1 and B-2 are shown in Table B-1.

The ink samples according to Examples B-1 through B-6 and Comparative Examples B-1 and B-2 were subjected to a storage stability test.

In the storage stability test, an ink sample was fully charged into a screw tube bottle, and the bottle was sealed. The sample ink was then left standing still at 50° C. for one month, and the color of ink sample was visually observed and was evaluated as "Good" when it did not change from the initial color, and was evaluated "Failure" when it faded.

TABLE B-1

| | Water resistance (%) | pH | Storage stability |
|---|---|---|---|
| Example B-1 | 88 | 10.5 | Good |
| Example B-2 | 98 | 8.7 | Good |
| Example B-3 | 99 | 9.4 | Good |
| Example B-4 | 99 | 8.7 | Good |
| Example B-5 | 99 | 8.7 | Good |
| Example B-6 | 99 | 9.5 | Good |
| Com. Ex. B-1 | 98 | 8.8 | Failure |
| Com. Ex. B-2 | 97 | 9.4 | Failure |

In addition, each of ink samples of Examples B-2 and B-4, and Comparative Examples B-1 and B-2 was charged into a screw tube bottle, and the bottle was sealed and was left standing still at 70° C. for two days. The optical spectra of the ink samples are shown in FIGS. 7, 8, 9 and 10, respectively.

Figure 7:
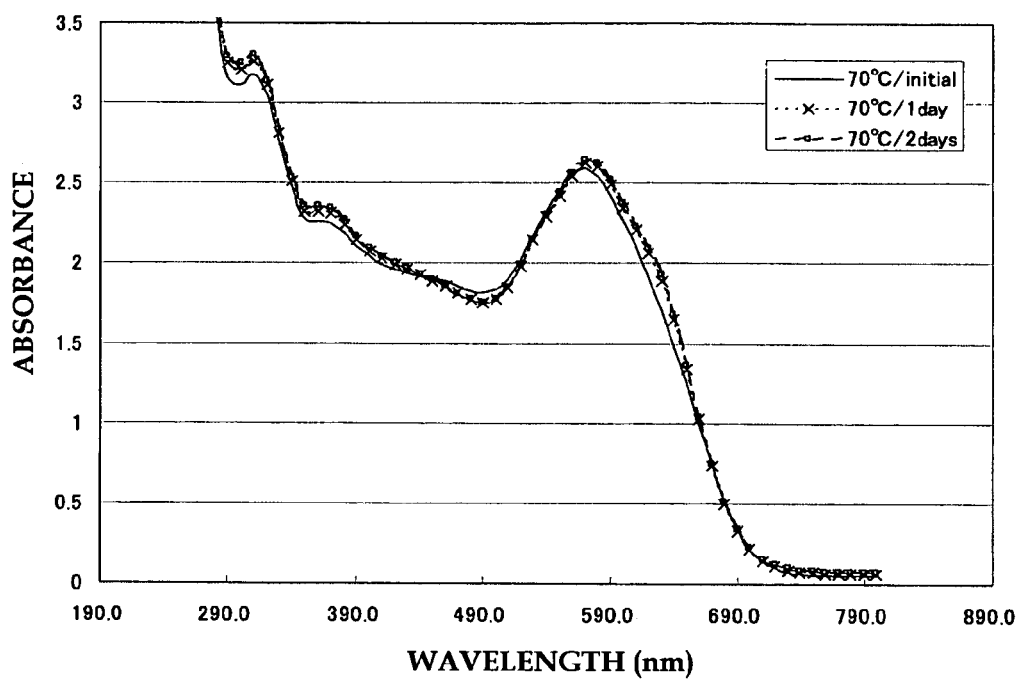
FIG. 7 is an absorption spectrum of an ink-jet recording ink according to Example B-2.
Figure 8:
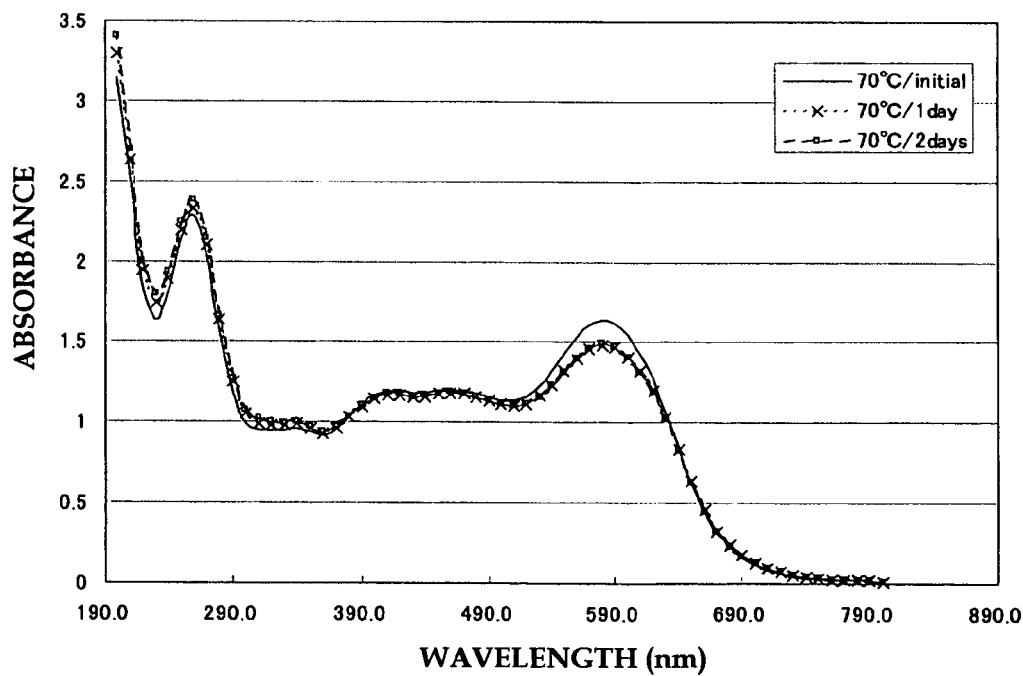
FIG. 8 is an absorption spectrum of an ink-jet recording ink according to Example B-4.
Figure 9:
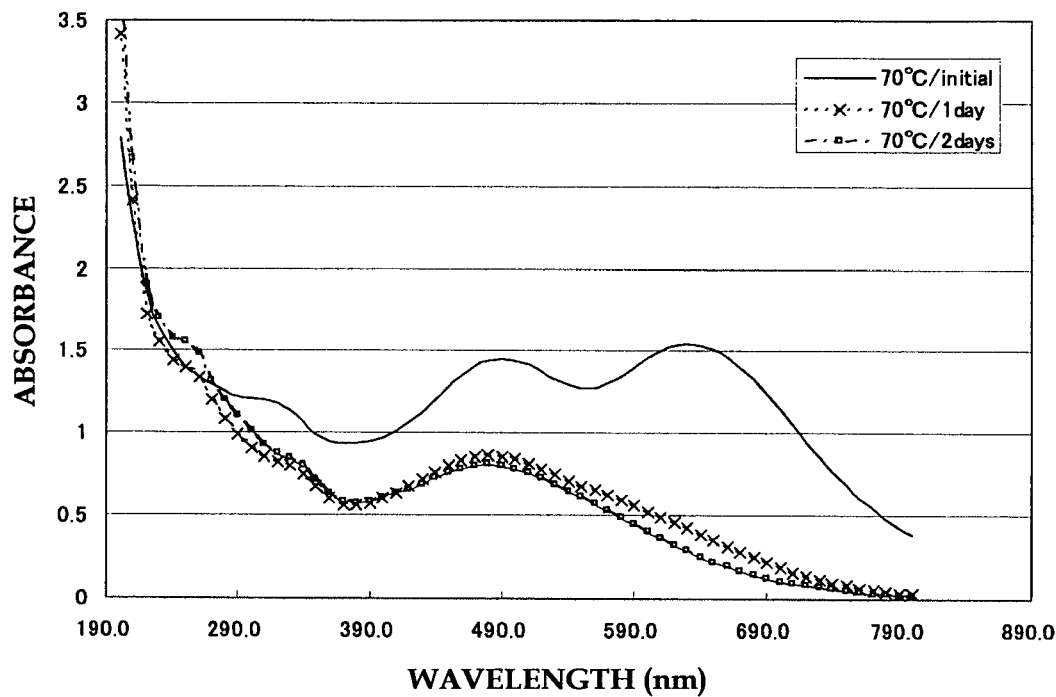
FIG. 9 is an absorption spectrum of an ink-jet recording ink according to Comparative Example B-1.
Figure 10:
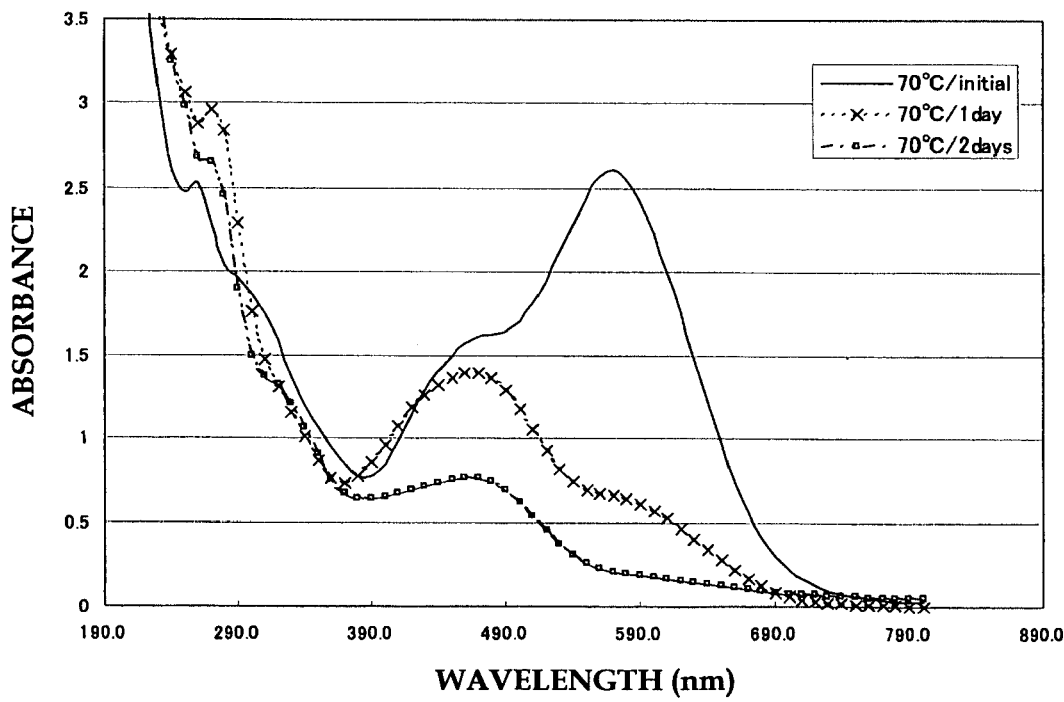
FIG. 10 is an absorption spectrum of an ink-jet recording ink according to Comparative Example B-2.

The inks according to Examples B-2 and B-4 show no change in optical absorption spectra (FIGS. 7 and 8). In contrast, the inks according to Comparative Examples B-1 and B-2 (FIGS. 9 and 10) show a significantly decreased absorbance after one-day or two-day storage with respect to the initial absorbance, indicating that these inks discolor after storage.

Table B-1 and FIGS. 7 to 10 show that the inks according to the first aspect of the present invention using a specific black dye in combination with an organosilicon compound can produce images which are free of fading even after storage in a long period of time and have excellent water resistance when printed on plain paper.

Examples C Corresponding to the Third Aspect of the Present Invention

Eleven ink-jet recording inks having the following compositions were prepared. The contents of components are percent by weight.

Example C-1

| | |
|---|---|
| C. I. Direct Blue 199 | 5% |
| Glycerol | 7% |
| Diethylene glycol | 5% |
| Organosilicon Compound (A) | 18.3% |
| N-Cyclohexyl-3-aminopropanesulfonic acid | 1% |
| Deionized water | 65.2% |

N-Cyclohexyl-3-aminopropanesulfonic acid and deionized water were mixed and were treated with a 1 mol/liter aqueous sodium hydroxide solution to pH 10.0 to 10.5, and other components were dissolved therein.

Example C-2

| | |
|---|---|
| C. I. Direct Blue 199 | 5% |
| Glycerol | 7% |
| Diethylene glycol | 5% |
| Organosilicon Compound (A) | 18.3% |
| Ammonium nitrate | 5% |
| N,N-Bis(2-hydroxyethyl)glycine | 1% |
| Deionized water | 60.2% |

N,N-Bis(2-hydroxyethyl)glycine and deionized water were mixed and were treated with a 1 mol/liter aqueous sodium hydroxide solution to pH of 8.5 to 9.0, and other components were dissolved therein.

Example C-3

| | |
|---|---|
| C. I. Direct Blue 199 | 5% |
| Glycerol | 7% |
| Diethylene glycol | 5% |
| Organosilicon Compound (A) | 18.3% |
| Diammonium hydrogen phosphate | 5% |
| N-Cyclohexyl-2-aminoethanesulfonic acid | 1% |
| Deionized water | 60.2% |

N-Cyclohexyl-2-aminoethanesulfonic acid and deionized water were mixed and were treated with a 1 mol/liter aqueous sodium hydroxide solution to pH of 8.5 to 9.0, and other components were dissolved therein.

Example C-4

| | |
|---|---|
| C. I. Direct Blue 199 | 5% |
| Glycerol | 7% |
| Diethylene glycol | 5% |
| Diethylene glycol monobutyl ether | 5% |
| Organosilicon Compound (A) | 18.3% |
| ammonium chloride | 5% |
| N-[Tris(hydroxymethyl)methyl]glycine | 1% |
| Deionized water | 55.2% |

N-[tris(hydroxymethyl)methyl]glycine and deionized water were mixed and were treated with a 1 mol/liter aqueous sodium hydroxide solution to pH of 8.5 to 9.0, and other components were dissolved therein.

Example C-5

| | |
|---|---|
| C. I. Acid Red 289 | 3.5% |
| Glycerol | 7% |
| Diethylene glycol | 5% |
| Diethylene glycol monobutyl ether | 5% |
| Organosilicon Compound (B) | 19.8% |
| Ammonium carbonate | 5% |
| N-Cyclohexyl-2-hydroxy-3-aminopropanesulfonic acid | 1% |
| Deionized water | 52.2% |

N-Cyclohexyl-2-hydroxy-3-aminopropanesulfonic acid and deionized water were mixed and were treated with a 1 mol/liter aqueous sodium hydroxide solution to pH of 9.0 to 9.5, and other components were dissolved therein.

Example C-6

| | |
|---|---|
| C. I. Direct Yellow 132 | 4% |
| Glycerol | 7% |
| Diethylene glycol | 5% |
| Diethylene glycol monobutyl ether | 5% |
| Organosilicon Compound (B) | 19.8% |
| Ammonium sulfate | 5% |
| N-Tris(hydroxymethyl)methyl-3-aminopropanesulfonic acid | 1% |
| Deionized water | 53.2% |

N-Tris(hydroxymethyl) methyl-3-aminopropanesulfonic acid and deionized water were mixed and were treated with a 1 mol/liter aqueous sodium hydroxide solution to pH of 8.5 to 9.0, and other components were dissolved therein.

Example C-7

| | |
|---|---|
| C. I. Direct Black 168 | 5% |
| Glycerol | 7% |
| Diethylene glycol | 5% |
| Diethylene glycol monobutyl ether | 5% |
| Organosilicon Compound (B) | 19.8% |
| Diammonium hydrogen phosphate | 5% |
| N-Cyclohexyl-2-aminoethanesulfonic acid | 1% |
| Deionized water | 60.2% |

N-Cyclohexyl-2-aminoethanesulfonic acid and deionized water were mixed and were treated with a 1 mol/liter aqueous sodium hydroxide solution to pH of 8.5 to 9.0, and other components were dissolved therein.

Example C-8

| | |
|---|---|
| Carbon black (CAB-O-JET TM 300; Cabot Corporation) | 33.3% |
| Glycerol | 7% |
| Diethylene glycol | 5% |
| Diethylene glycol monobutyl ether | 5% |
| Organosilicon Compound (A) | 18.3% |
| Ammonium borate | 5% |
| N-Tris(hydroxymethyl)methyl-3-aminopropanesulfonic acid | 1% |
| Deionized water | 25.4% |

N-Tris(hydroxymethyl) methyl-3-aminopropanesulfonic acid and deionized water were mixed and were treated with a 1 mol/liter aqueous sodium hydroxide solution to pH of 9.0 to 9.5, and other components were dissolved therein.

Example C-9

| | |
|---|---|
| Cyan pigment (FUJI SP BLUE 6403; Fuji C.I. Pigment Co., Ltd.) | 27.8% |
| Glycerol | 5% |
| Diethylene glycol | 5% |
| Diethylene glycol monobutyl ether | 5% |
| Organosilicon Compound (B) | 19.8% |
| Diammonium hydrogen phosphate | 5% |
| N-Cyclohexyl-2-aminoethanesulfonic acid | 1% |
| Deionized water | 31.4% |

N-Cyclohexyl-2-aminoethanesulfonic acid and deionized water were mixed and were treated with a 1 mol/liter aqueous sodium hydroxide solution to pH of 8.5 to 9.0, and other components were dissolved therein.

Example C-10

| | |
|---|---|
| Magenta pigment (FUJI SP MAGENTA 9352; Fuji C.I. Pigment Co., Ltd.) | 33.3% |
| Glycerol | 5% |
| Diethylene glycol | 5% |
| Diethylene glycol monobutyl ether | 5% |
| Organosilicon Compound (A) | 18.3% |
| Ammonium carbonate | 5% |
| N-Cyclohexyl-2-hydroxy-3-aminopropanesulfonic acid | 1% |
| Deionized water | 27.4% |

N-Cyclohexyl-2-hydroxy-3-aminopropanesulfonic acid and deionized water were mixed and were treated with a 1 mol/liter aqueous sodium hydroxide solution to pH of 9.0 to 9.5, and other components were dissolved therein.

Example C-11

| | |
|---|---|
| Yellow pigment (FUJI SP YELLOW 4254; Fuji C.I. Pigment Co., Ltd.) | 41.6% |
| Glycerol | 4% |
| Diethylene glycol | 5% |
| Diethylene glycol monobutyl ether | 5% |
| Organosilicon Compound (A) | 18.3% |
| Ammonium carbonate | 5% |
| N-Cyclohexyl-2-hydroxy-3-aminopropanesulfonic acid | 1% |
| Deionized water | 20.1% |

N-Cyclohexyl-2-hydroxy-3-aminopropanesulfonic acid and deionized water were mixed and were treated with a 1 mol/liter aqueous sodium hydroxide solution to pH of 9.0 to 9.5, and other components were dissolved therein.

Comparative Example C-1

| | |
|---|---|
| C. I. Direct Blue 199 | 5% |
| Glycerol | 7% |
| Diethylene glycol | 5% |
| Diethylene glycol monomethyl ether | 5% |
| Deionized water | 78% |

Comparative Example C-2

| | |
|---|---|
| C. I. Direct Blue 199 | 5% |
| Glycerol | 7% |
| Diethylene glycol | 5% |
| Diethylene glycol monobutyl ether | 5% |
| Organosilicon Compound (A) | 5% |
| Deionized water | 73% |

Comparative Example C-3

| | |
|---|---|
| C. I. Direct Blue 199 | 5% |
| Glycerol | 7% |
| Diethylene glycol | 5% |
| Diethylene glycol monobutyl ether | 5% |
| Organosilicon Compound (A) | 5% |
| Ammonium chloride | 5% |
| Deionized water | 73% |

The water resistance and pH of the inks according to Examples C-1 through C-11 and Comparative Examples C-1 through C-3 are shown in Table C-1.

Ink samples according to Examples C-1 through C-11 and Comparative Examples C-1 through C-3 were then subjected to a storage stability test.

In the storage stability test, an ink sample was fully charged into a screw tube bottle, and the bottle was sealed. The sample ink was then left standing still at 50° C. for one month, and the presence or absence of flocculation was visually observed. Where necessary, the stored sample was filtrated through a filter having 0.45-μm pores to thereby determine the presence of flocculation. The results in the storage stability test are shown in Table C-1.

In Table C-1, "Good" means that there is no flocculation, and "Failure" means that there is flocculation.

TABLE C-1

| | Water resistance (%) | pH | Storage stability |
|---|---|---|---|
| Example C-1 | 88 | 10.5 | Good |
| Example C-2 | 98 | 8.7 | Good |
| Example C-3 | 99 | 8.9 | Good |
| Example C-4 | 99 | 8.7 | Good |
| Example C-5 | 99 | 9.5 | Good |
| Example C-6 | 98 | 8.7 | Good |
| Example C-7 | 99 | 8.9 | Good |
| Example C-8 | 97 | 9.5 | Good |
| Example C-9 | 97 | 8.9 | Good |
| Example C-10 | 97 | 9.7 | Good |
| Example C-11 | 97 | 9.7 | Good |
| Com. Ex. C-1 | 55 | 7.8 | Good |
| Com. Ex. C-2 | 87 | 10.4 | Failure |
| Com. Ex. C-3 | 99 | 8.9 | Failure |

The inks according to Examples C-1 through C-11 showed no flocculation both on visual observation and on filtering. In contrast, the inks according to Comparative Examples C-2 and C-3 containing the organosilicon compound without incorporation of a pH buffer showed flocculation.

The ink-jet recording inks according to the third aspect of the present invention comprise a pH buffer in addition to a colorant, a moisturizer, water and a water-soluble substance capable of undergoing polycondensation along with vaporization of water. The inks do not invite clogging even in printing after long-term storage and can produce images with high water resistance. In these inks, the water-soluble substance rapidly undergoes polycondensation on a recording medium in the same manner as immediately after preparation and can surround the colorant rapidly and securely.

Examples D Corresponding to the Fourth Aspect of the Present Invention

An ink-jet recording ink (Ink A) having the following composition was prepared. The contents of components are percent by weight.

Ink A contained C. I. Acid Red 289 as a dye, glycerol and diethylene glycol as moisturizers, diethylene glycol monobutyl ether as a penetrating agent, and Organosilicon Compound (A) as a water-soluble capable of undergoing polycondensation along with vaporization of water.

| Ink A | |
|---|---|
| C. I. Acid Red 289 | 5% |
| Glycerol | 7% |
| Diethylene glycol | 5% |
| Diethylene glycol monobutyl ether | 5% |
| Organosilicon Compound (A) | 5% |
| (With purity of 27.3%, actual inclusion is 18.3%) | |
| Deionized water | 73% |

Example D-1

A surface sizing composition (100 g) was prepared by mixing 20 g of a commercially available cationic surface sizing agent (trade name: Basoplast 265D; available from BASF Japan) with water up to 100 g. The surface sizing composition was applied to a commercially available plain paper (trade name: Xerox 4024, available from Xerox Limited) to an amount of 0.8 g/m² in terms of solid content using a wire bar, was dried with a dryer and thereby yielded a print medium.

Ink A was discharged onto the print medium using Recording Apparatus A to thereby form a 15-mm square solid image.

Example D-2

A print medium was prepared by the procedure of Example D-1, except for using 25 g of a commercially available cationic surface sizing agent Pearlgum CS (trade name, available from Seiko PMC Corporation) in the surface sizing composition and for applying the surface sizing composition to an amount in terms of solid content of 2.1 g/m². A solid image was printed on the print medium by the procedure of Example D-1.

Example D-3

A print medium was prepared by the procedure of Example D-1, except for using a commercially available surface sizing agent SS 331 (trade name, available from Seiko PMC Corporation) in the surface sizing composition and for applying the surface sizing composition to an amount in terms of solid content of 1.5 g/m². A solid image was printed on the print medium by the procedure of Example D-1.

Example D-4

A print medium was prepared by the procedure of Example D-1, except for using a commercially available surface sizing agent NC Size C-25 (trade name, available from Nicca Chemical Co., Ltd.) in the surface sizing composition and for applying the surface sizing composition to an amount in terms of solid content of 1.5 g/m². A solid image was printed on the print medium by the procedure of Example D-1.

Example D-5

A print medium was prepared by the procedure of Example D-1, except for using a commercially available surface sizing agent Sizepine K-903 (trade name, available from Arakawa Chemical Industries, Ltd.) in the surface sizing composition and for applying the surface sizing composition to an amount in terms of solid content of 3.5 g/m². A solid image was printed on the print medium by the procedure of Example D-1.

Example D-6

A print medium was prepared by the procedure of Example D-1, except for using a commercially available surface sizing agent "Filers-size" K-270 (trade name, available from Kindai Kagaku Kogyo Co., Ltd.) in the surface sizing composition and for applying the surface sizing composition to an amount in terms of solid content of 0.6 g/m². A solid image was printed on the print medium by the procedure of Example D-1.

Comparative Example D-1

A solid image was printed by the procedure of Example D-1, except for using a commercially available plain paper (trade name: Xerox 4024, available from Xerox Limited) as the print medium.

Comparative Example D-2

A solid image was printed by the procedure of Example D-1, except for using a commercially available plain paper (trade name: Myrecycle Paper 100W, available from Ricoh Company Limited) as the print medium.

Comparative Example D-3

A solid image was printed by the procedure of Example D-1, except for using a commercially available plain paper (trade name: Multiace, available from Fuji Xerox Office Supply Co., Ltd.) as the print medium.

The water resistance of image samples according to Examples D-1 through D-6 and Comparative Examples D-1 through D-3 was determined.

The results are shown in Table D-1.

TABLE D-1

|  | Water resistance (%) |
| --- | --- |
| Example D-1 | 98 |
| Example D-2 | 99 |
| Example D-3 | 99 |
| Example D-4 | 98 |
| Example D-5 | 97 |
| Example D-6 | 99 |
| Com. Ex. D-1 | 85 |
| Com. Ex. D-2 | 81 |
| Com. Ex. D-3 | 83 |

Table D-1 shows that images produced according to Comparative Examples D-1 through D-3 had low water resistance of 81% to 85%, and in contrast, those according to Examples D-1 through D-6 had high water resistance of 97% or more, 12 points to 16 points higher than those of Comparative Examples D-1 through D-3.

An image was then formed on a plain paper Xerox 4024 (trade name, available from Xerox Limited) according to Examples D-1 through D-6 and Comparative Examples D-1 through D-3, respectively, using a commercially available printer (trade name: EM-930C, available from Seiko Epson Corporation). The paper immediately after image formation was immersed in deionized water, was left standing still at room temperature and thereby dried, and whether or not the image bled was observed.

The images formed according to Comparative Examples D-1 through D-3 showed bleed at its edges, but the images formed according to Examples D-1 through D-6 using the plain-paper-like print media treated with a cationic surface sizing agent showed substantially no bleed. These results show that the method of the present invention using an ink-jet recording ink containing an anionic-group-containing colorant, a moisturizer, water and a water-soluble substance capable of undergoing polycondensation along with vaporization of water can form images with significantly improved water resistance.

In Examples D, a magenta dye was used as the colorant, but similar results were obtained on other dyes and pigments used as the colorant.

In the image forming method according to the fourth aspect of the present invention, a plain-paper-like print medium having a surface treated with a cationic surface sizing agent is used in an image forming method of discharging an ink-jet recording ink through nozzles onto the print medium, which ink comprises an anionic-group-containing colorant, a moisturizer, water and a water-soluble substance capable of undergoing polycondensation along with vaporization of water. The cationic surface sizing agent reacts with the anionic group of the colorant to thereby secure the colorant onto the print medium, and then the water-soluble substance undergoes polycondensation along with vaporization of water and surrounds the colorant to thereby further secure the colorant onto the print medium. Thus, even when the image formed on the print medium gets wet with water, the colorant does not bleed out into water and the image shows significantly improved water resistance. More specifically, the water resistance of the image can be improved by fixing activities of the cationic surface sizing agent and by securing activities of the specific water-soluble substance.

While the present invention has been described with reference to what are presently considered to be the preferred embodiments, it is to be understood that the present invention is not limited to the disclosed embodiments. On the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink-jet recording ink comprising:
   a colorant;
   a moisturizer;
   water;
   a water-soluble substance capable of undergoing polycondensation along with vaporization of the water; and
   a pH buffer;
   wherein the pH buffer comprises at least one member selected from the group consisting of N,N-bis(2-hydroxyethyl) glycine, N-cyclohexyl-3-aminopropanesulfonic acid, N-cyclohexyl-2-hydroxy-3-aminopropanesulfonic acid, N-cyclohexyl-2-aminoethanesulfonic acid, N-tris (hydroxymethyl) methyl-3-aminopropanesulfonic acid and N-[tris (hydroxymethyl) methyl] glycine.

2. The ink-jet recording ink according to claim 1, which has a pH of 8.0 to 11.0.

3. The ink-jet recording ink according to claim 1, wherein the water-soluble substance is at least one organosilicon compound.

4. The ink-jet recording ink according to claim 1, further comprising a polycondensation promoter capable of accelerating the polycondensation of the water-soluble substance.

5. The ink-jet recording ink according to claim 4, wherein the polycondensation promoter is at least one of inorganic ammonium salts and organic ammonium salts.

6. The ink-jet recording ink according to claim 5, wherein the ammonium salts are salts of weak acids.

7. The ink-jet recording ink according to claim 5, wherein the ammonium salts are salts of strong acids.

* * * * *